Figures 5, 6:
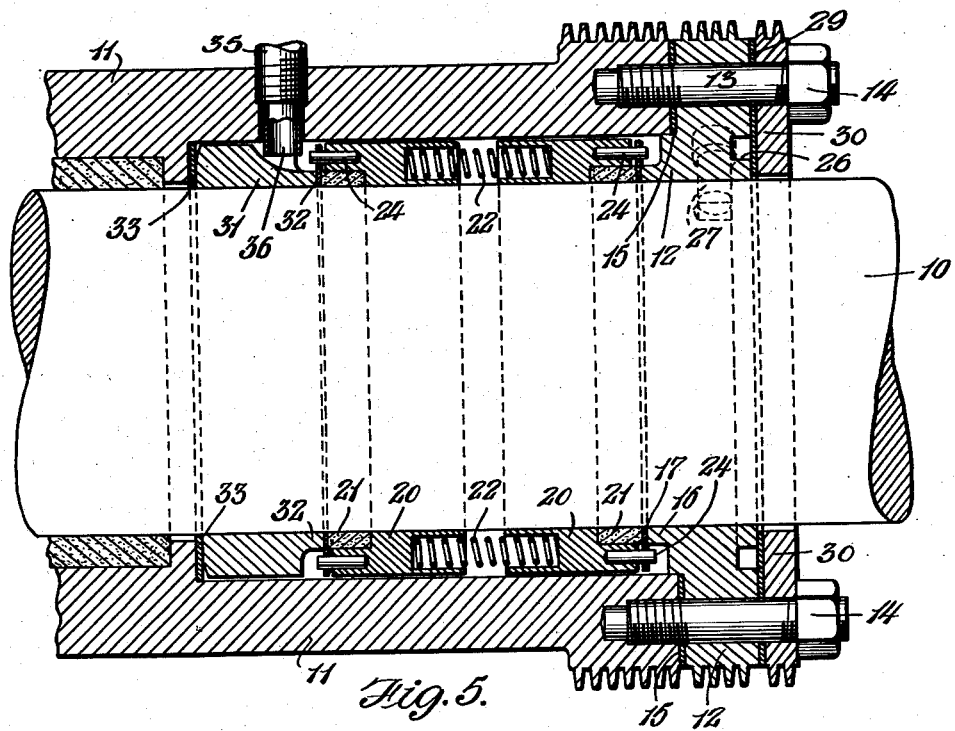

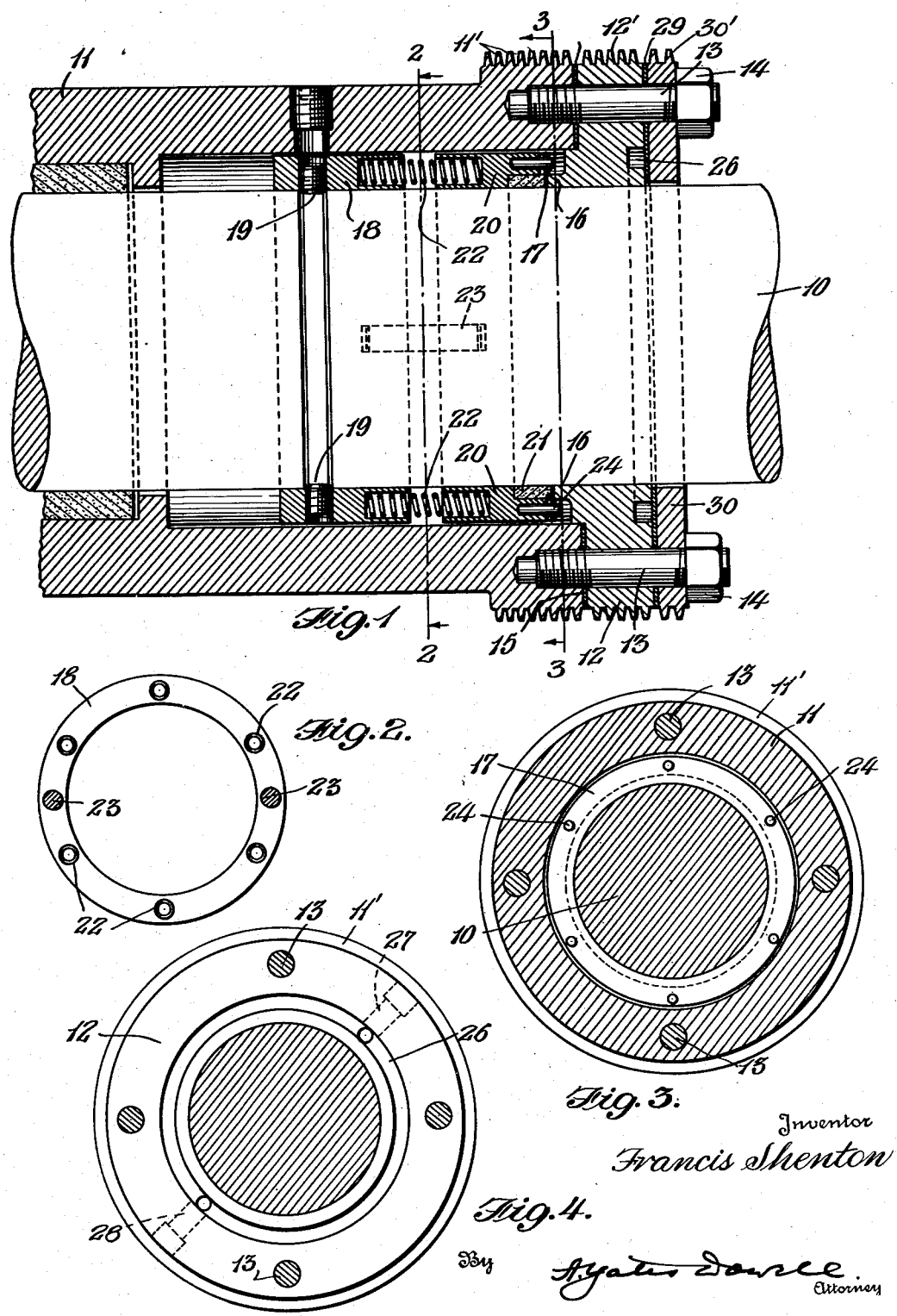

Inventor
Francis Shenton

Patented Nov. 12, 1935

2,020,436

UNITED STATES PATENT OFFICE 2,020,436

SHAFT SEAL

Francis Shenton, Waynesboro, Pa., assignor to Frick Company, Waynesboro, Pa., a corporation of Pennsylvania Application June 13, 1935, Serial No. 26,465

5 Claims. (Cl. 286—7)

This invention relates to refrigeration and more particularly to the provision of a pressure tight seal around a rotating shaft where it passes through a wall, as for example, the wall of a crank case or the like to prevent leakage of refrigerant fluid through the wall along the shaft by means of which power is supplied for driving the compressor.

Shaft seals generally are old in the art; however, seals previously in use have been unsuitable for use in sealing joints around shafts of large diameter and especially those having relative high rotational speed. One of the difficulties in providing a successful shaft seal has been on account of the generation of excessive heat due to friction and which resulted in deformation of the parts of the seal, such as for example the ground surfaces, thus producing a leak at the joint.

It is an object of the present invention to provide a shaft seal particularly susceptible for use in conjunction with the compressor of a refrigerating system and which is effective to seal joints around the large or small shafts rotating at either high or low speeds.

A further object of the invention is to provide a seal capable of withstanding high temperatures and having characteristics capable of compensating for warping or deformation due to heat or other causes.

Fig. 1 is a longitudinal section illustrating one application of the invention.

Fig. 2, a detail of the rear spring retainer ring of Fig. 1.

Fig. 3, a section on line 3—3 of Fig. 1.

Fig. 4, a front elevation of the sealing flange shown in Fig. 1.

Fig. 5, a section of a modified seal, and

Fig. 6, a similar view of a further modified form.

Referring to the drawings, in Fig. 1 is shown a shaft 10 which extends through the wall 11 of the housing or crank case of a compressor or the like of a refrigerating system and by means of which power is supplied for driving the compressor or other mechanism.

The wall 11 is provided with an enlarged bore around the shaft 10 to accommodate the sealing mechanism, such enlarged bore being formed either in the wall or in an extension thereof.

A sealing flange 12 is attached to the cylindrical extension of the wall 11 by means of bolts or studs 13 and nuts 14, the joint being made pressure tight by means of a gasket 15. The sealing flange 12 is provided with a relatively thin neck 16 having its end surface ground and in intimate contact with a flexible sealing and wear ring 17 mounted to rotate with the shaft 10 and be forced against the ground face of the thin neck 16 of the sealing flange.

The sealing ring 17 is of relatively thin material in order that it can flex to compensate for inequalities due to warpage caused by heating or for any other reason and this thin flexible sealing disc receives the wear caused by its rotation in contact with the stationary ground end surface of the thin neck of the sealing flange. The flexible sealing and wear receiving ring 17 is fastened to the shaft 10 by means of a series of set screws, rings and dowel pins.

An inner or rear spring retaining ring 18 is fastened solidly to the shaft 10 by set screws 19 or in any other desired manner of clamping a collar to a shaft. An outer or front spring retaining ring 20 is disposed around shaft 10 in spaced relation to the ring 18 and has an annular channel in which is located a packing ring 21 of any desired material.

The packing ring 21 is slightly wider than the channel in which it is mounted in order to be compressed between the sealing ring 17 and the spring retaining ring 20. The compressing action of the ring 21 is accomplished by means of springs 22 between the rings 18 and 20. As shown the springs 22 are small coiled springs of which several are used and these springs have their ends disposed in pockets in the rings 18 and 20. Instead of a plurality of small coil springs as shown a single spring encircling the shaft 10 may be used, the invention contemplating the use of one or a number of springs as illustrated. On large diameter shafts several small springs 22 as shown are preferable since experience has shown that a more even circumferential pressure is exerted than with a single spring.

Although friction between the parts will tend to cause rotation of the front retaining ring 20 with the shaft positive rotation may be assured by the provision of dowel pins 23 between the rings 18 and 20. In like manner the flexible wear and sealing ring 17 will be caused to rotate with the shaft 10 on account of the greater friction between this ring and the packing ring 21. However, positive rotation of the ring 21 with the shaft 10 may be accomplished by means of dowel pins 24 seated in the front spring retainer ring 20 and extending through apertures in the ring 17. The invention contemplates the use or non-use of dowel pins as desired or other equivalent means of assuring rotation between the associated parts.

In order to dissipate heat caused by friction between the fixed and rotating members in the vicinity of the seal around the shaft the sealing flange 12 may be provided with a groove 26 in its outer face and cooling fluid is adapted to be supplied and discharged from this groove or channel through passages 27 and 28, (see Fig. 4). The groove or channel 26 for the cooling fluid is covered by a gasket 29 and flange 30 held in place by the bolts 13 and nuts 14. While a particular cooling fluid channel or passage is illustrated the invention contemplates the incorporation of a cooling fluid passage in any desired manner as for example by the flange being machined or cored as desired.

The invention contemplates an additional cooling provision of this character only where the same is advisable or where the combination of pressure between the sealing flange and the flexible disc and the rubbing speed between the two members is such as to generate heat sufficient to produce dangerously high temperature without fluid cooling. Where the amount of heat generated is relatively small the heat will be dissipated without the necessity of any additional cooling provision. If desired additional or enlarged cooling surfaces may be provided such as heat radiating fins, 11', 12', and 30' as shown.

Instead of a single sealing ring and gasket, one or more additional sealing rings may be provided as shown in Fig. 5, there being two such rings illustrated. The front spring retainer ring 20 and the associated parts which form the ground joint are the same as previously described with reference to Figs. 1 and 4. Instead of the back spring retainer ring the front spring retainer ring is duplicated along with the packing 21, flexible disc 17, and dowel pins 24.

The springs 22 force the retainer rings apart and a seal is formed by each retainer ring. In order to provide a seal with the rearmost retainer ring a wear ring 31 is placed in the rear of the counter bore which accommodates the sealing mechanism, which ring 31 is provided with a thin annular bearing surface 32 corresponding to the surface 16 of the sealing flange 12. The ring 31 may directly engage the terminus of the bore in which the sealing mechanism is located or if desired a gasket 33 may be interposed.

With the above described construction, due to friction, the ring 31 will tend to remain stationary while the rings 20 and the sealing disc 17 will tend to rotate. To render the ring 31 positively stationary any desired means may be employed similar to that shown for holding the ring 18 stationary or if desired a pipe nipple 35 may be employed which has an extension 36 engaging a slot in the ring 31.

It will be readily apparent that the main difference between the constructions of Figs. 1 and 5 is that in Fig. 1 the inner or rear spring retainer ring is fastened to the shaft to provide a purchase for the springs 22, only one pressure tight joint being provided, while in Fig. 5 the rear spring retainer ring compresses a packing against the thin sealing ring 32 which bears against the ring 31 which forms a thrust bearing, the construction thus providing two or more pressure tight joints, one at 16 and one at 32 instead of a single pressure tight joint. If desired with the construction of Fig. 5 only one of the joints need be ground. With the constructions of both Figs. 1 and 5 leakage will be prevented when the shaft moves axially. This is particularly on account of the flexible nature of the member 17, that is, the member 17 is sufficiently flexible to perfectly adapt itself to its seat against the member 12 with such spring pressure as it is practical to use.

In Fig. 6 is shown a second modification wherein the sealing structure is added as an accessory of the housing through which the shaft extends, the seal not being enclosed in the housing or an extension of the same. In other words the sealing structure is reversed to place it without the casing instead of within the same as shown in the preceding figures. In this structure a sealing flange 37 is secured by bolts 13 and nuts 14 to the housing 11 and an annular wearing shoulder 38 is provided against which the flexible ring 17 is urged by packing ring 21, spring ring 20 and springs 22 as previously described. A retainer ring 39 is clamped on the shaft 10. Instead of as in Fig. 1 the ring 39 is split and the split ends are clamped together by means of a bolt 40. Likewise means is provided for adjusting the tension of each of the springs 22, such means being a plate 41 in the bottom of each pocket in which the springs 22 are received, and a set screw 42 is provided for moving each plate 41 longitudinally of the shaft 10.

In operation with the construction shown in Figs. 1 to 4, shaft 10 rotates within the stationary portion of the housing 11 and the shaft carries with it front and rear retainer rings 20 and 18, springs 22, flexible disc 17 and gasket 21. Sealing flange 12 is stationary with the housing 11 and the wearing surfaces are between the ground face 16 of the sealing flange and the flexible disc 17. The annular space around the shaft 10 within the wall 11 will be filled with fluid at a pressure above or below atmospheric, the leakage of which into or out of the casing, this invention is designed to prevent.

The springs 22 force the flexible disc 17 against the face 16 with sufficient pressure to prevent fluid leakage therebetween. Also packing 21 is compressed against the shaft 10 sufficiently to prevent leakage between the packing and the shaft. Leakage between the wall and the sealing flange is prevented by the gasket 15. With these several places sealed, leakage of fluid in either direction will be prevented no matter whether the shaft is rotated or not.

Unlike conventional shaft packing, wear upon the package 21 is substantially eliminated due to the fact that there is no appreciable movement to this packing relative to any surface with which it comes in contact. The only motion that can occur is very slight due to misalignment of the face of the sealing flange with respect to the shaft. This misalignment is accommodated by the yielding of the disc 17 under the influence of the springs 22 under some conditions and produces a slight sliding motion of the packing. Under certain conditions also the packing may flex internally without sliding motion.

The operation of the structure of Figs. 5 and 6 is closely analogous to that of Fig. 1. In Fig. 5 the retainer rings 20 rotate with the shaft as do the packing rings 21 and the disc 17. The disc 17 is held in firm contact with the stationary bearing surfaces 16 and 32.

With the structure of Fig. 6 the sealing flange 37 is fixed to the housing 11 and presents a fixed bearing surface 38 which engages the face of the ring 17 which rotates with the shaft 10. The retainer ring 39 is clamped on the shaft and assists in causing the retainer ring 20 and associated parts to rotate with the shaft.

It will be obvious to those skilled in the art that various changes may be made in my device without departing from the spirit of the invention and therefore I do not limit myself to what is shown in the drawings and described in the specification but only as indicated in the appended claims.

I claim:

1. A seal for the joint between a shaft and a stationary member through which the shaft extends one of which is provided with an annular bearing face, comprising a metal sealing ring surrounding said shaft and engaging said annular bearing face, a compressible packing ring surrounding said shaft and engaging said sealing ring, and means behind said packing ring for maintaining said packing in compressed condition against said sealing ring to cause the same to produce a sealing engagement with said annular bearing face, said sealing ring having sufficient flexibility to contact said bearing face throughout its extent irrespective of inequalities incident to construction and operation.

2. A seal for the joint between a shaft and a housing through which the shaft extends which housing is provided with an annular bearing face, comprising a metal sealing ring surrounding said shaft and engaging said bearing face, a compressible packing surrounding said shaft and engaging the sealing ring on the side opposite said bearing face, a follower having a seat for the said packing, and means urging said follower towards said bearing face for maintaining the packing in compressed condition against the rear of the sealing ring and for maintaining the front of the sealing ring against said annular bearing face to cause said sealing ring to have sealing engagement with said bearing face, said sealing ring having sufficient flexibility to annularly engage said bearing face regardless of inequalities therein as a result of its manufacture or changing configuration due to use.

3. A seal for the joint between a rotatable shaft and a wall through which the shaft extends, said wall having an annular bearing face, said seal comprising a thin flexible sealing ring surrounding said shaft and having sealing engagement with said annular bearing face, a compressible packing surrounding said shaft and engaging the rear face of said sealing ring, a follower behind said compressible packing, and means behind said follower for urging the parts together to produce a tight seal, said sealing ring being sufficiently flexible to maintain sealing engagement with said bearing face regardless of inequalities produced by heat of friction.

4. A seal for the joint between a shaft and a stationary member through which the shaft extends, one of which is provided with an annular bearing face, said seal comprising a thin flexible sealing ring surrounding said shaft and having sealing engagement with said annular bearing face and being mounted in sealing engagement with the other of said members, and means for maintaining said sealing ring and annular bearing face in sealing engagement, said sealing ring having sufficient flexibility to maintain a tight seal regardless of inequalities incident to construction and operating conditions.

5. A seal for the joint between a shaft and a stationary member through which the shaft extends, one of which is provided with an annular bearing face, said seal comprising a thin flexible sealing ring surrounding said shaft and having sealing engagement with said annular bearing face and being mounted in sealing engagement with the other of said members, means for maintaining said sealing ring and annular bearing face in sealing engagement, said sealing ring having sufficient flexibility to maintain a tight seal regardless of inequalities incident to construction and operating conditions, means for locking said sealing ring to one of the members to which it has sealing engagement, and means for removing frictional heat generated between the relatively moving parts.

FRANCIS SHENTON.